United States Patent
Kuwabara et al.

(10) Patent No.: US 9,169,867 B2
(45) Date of Patent: Oct. 27, 2015

(54) LINEAR MOTION GUIDE UNIT

(71) Applicant: NIPPON THOMPSON CO., LTD., Tokyo (JP)

(72) Inventors: Hideki Kuwabara, Mino (JP); Shunsuke Kikuchi, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/597,458

(22) Filed: Jan. 15, 2015

(65) Prior Publication Data
US 2015/0219151 A1 Aug. 6, 2015

(30) Foreign Application Priority Data
Jan. 31, 2014 (JP) .................................. 2014-016600

(51) Int. Cl.
*F16C 29/06* (2006.01)

(52) U.S. Cl.
CPC .................................. *F16C 29/0611* (2013.01)

(58) Field of Classification Search
CPC .................................................. F16C 29/0611
See application file for complete search history.

(56) References Cited

U.S. PATENT DOCUMENTS

| 5,800,064 | A | * | 9/1998 | Ohya .............................. 384/44 |
| 2007/0071372 | A1 | * | 3/2007 | Kuwabara et al. .............. 384/44 |
| 2009/0016654 | A1 | * | 1/2009 | Kakei ............................. 384/44 |
| 2013/0108193 | A1 | * | 5/2013 | Kuwabara et al. .............. 384/13 |

FOREIGN PATENT DOCUMENTS

| JP | 09-072335 A | 3/1997 |
| JP | 2006-105310 A | 4/2006 |
| JP | 2013-092236 A | 5/2013 |

* cited by examiner

*Primary Examiner* — Thomas R. Hannon
(74) *Attorney, Agent, or Firm* — Browdy and Neimark, PLLC

(57) ABSTRACT

A sleeve fits in a through-hole in a carriage to provide a return passage which makes sure of both the flexibility and the stiffness of the sleeve. The sleeve is constituted with fore and aft circular ends, a pair of columns and a pair of flexible columns lying lengthwise between the fore and aft circular ends to guide the roller, lengthwise slits lying between the flexible columns and the columns, and complementary ends made on the terminals of the fore and aft circular ends. The flexible columns have raised lands having curved outer surfaces, and recessions flanked by the raised lands and having rolling wall surfaces or the return passage. The raised lands and the recessions are arranged alternately in the lengthwise direction of the sleeve to give the sleeve the capability of elastic deformation.

10 Claims, 13 Drawing Sheets

LINEAR MOTION GUIDE UNIT

FIELD OF THE INVENTION

The present invention relates to a linear motion guide unit comprised of an elongated guide rail, and a slider that is allowed to move on the elongated guide rail relatively to the guide rail by virtue of more than one rolling element.

BACKGROUND OF THE INVENTION

Recently advanced machines and instruments including semiconductor fabricating equipment, precision machines, measurement/inspection equipment and so on are increasingly envisioned to be compact in construction from many aspects of conserving energy as well as keeping high efficiency benefits. Accordingly, the linear motion guide units incorporated in the relatively sliding parts in a diversity of machines are also needed to be compact in construction and large in load-carrying capacity enough to allow smooth relative sliding movement of a slider along a guide rail. Meanwhile, cylindrical rolling elements rather than balls are preferred for making the liner motion guide unit larger in load-carrying capacity and, among the liner motion guide units using the cylindrical rolling elements or rollers, the slider needs to be compact in construction, especially shorter in length or traveling direction.

In the commonly assigned prior patent document 1 (Japanese Laid-Open Patent Application No. H09-72 335) which will be referred below, there is disclosed the linear motion guide unit in which a carriage in a slider has a return-bore where a sleeve fit to provide a return passage. The sleeve is made to suffer elastic deformation to alleviate the sliding resistance which would be encountered when rolling elements roll through the sleeve, thereby making sure of smooth rolling movement of the rolling elements. With the prior linear motion guide unit constructed as stated earlier, the sleeve fits in the return-bore to provide the return passage extending across the overall length of the return-bore with leaving a circular space between an inside circular wall around the return-bore and an outside circular surface around a radially reduced zone of the sleeve, the circular space being prepared for relieving the elastic deformation of the sleeve. The sleeve is provided in lengthwise direction thereof with a slit and held at fore-and-aft ends thereof to the return-bore, but allowed at the middle zone thereof to alleviate the frictional resistance which would be encountered when rollers roll through the sleeve, thereby making sure of smooth sliding movement of the slider on the guide rail.

In the commonly assigned prior patent document 2 (Japanese Laid-Open Patent Application No. 2006-105 310) there is disclosed a linear motion guide unit in which the return passage is formed with a pipe improved in rigidity or stiffness to make sure of steady application of lubricant around the rolling elements, thereby realizing maintenance-free lubrication. With the linear motion guide unit constructed as stated just earlier, the return passage is defined with a through-hole inside a pipe extending through a lengthwise hole in the carriage. The pipe has windows into which a porous member fits snugly. Lubricant is applied around the rolling elements when the rolling elements roll through the return passage while coming in to engagement with the porous member.

In the commonly assigned prior patent document 3 (Japanese Laid-Open Patent Application No. 2013-92 236) there is disclosed a linear motion guide unit in which a return passage is constituted with a sleeve which fits into a return-bore in a carriage of a slider. With the prior linear motion guide unit made lengthwise short and compact in construction, a cylindrical member to provide the return passage is inserted into a lengthwise bore in the carriage in the slider to make sure of smooth rolling though the return passage. More especially, the cylindrical member to provide the return passage is inserted the lengthwise bore in the carriage with leaving a clearance between them. The cylindrical member has two members susceptible to elastic deformation, one of the members is a bridged beam portion supported at both lengthwise ends thereof and another of the two members is a cantilevered beam portion. Both types of the beam portions are allowed to undergo the elastic deformation under an impact force caused by the rolling elements. The bridged beam portion is born at end support sections formed around the outside peripheries of the cylindrical member and the cantilevered beam portion is fastened or retained at a one end thereof and freed at another end thereof to bend or warp.

Subject to be Solved with the Present Invention

With the prior linear motion guide unit recited last, the return sleeve is designed to have a middle section which is reduced radially to provide a circular clearance to isolate the middle section from the inside circular wall around the return bore in the carriage of the slider. The middle section of the return sleeve is lengthwise slit to make easily elastic deformation at the middle section to relax frictional resistance which is encountered when the rollers roll over the middle section of the sleeve, thereby realizing smooth sliding movement of the slider. With the prior linear motion guide unit recited last, nevertheless, the middle section of the return sleeve, as made less in thickness, becomes easier in deformation with a large amount of elastic deformation. If the clearance between the return bore and the sleeve is too large, the elastic deformation in the sleeve also becomes too large, so that the rollers run through the sleeve, with deflecting much up and down. Thus, adjacent rollers come into collision with each other at a large contact angle and, as a result, are apt to get frictionally clogging up the return passage. Moreover, in case where making the return bore less in diameter to lessen the clearance left between the return bore and the sleeve, there causes a major question in which the sleeve as backed up with metallic casing wouldn't cause more deformation enough to ease or relieve the frictional resistance around the rollers.

With the linear motion guide unit shown in FIGS. 20 to 23, for example, a sleeve 7A fits into a return bore 8A in a carriage to provide a return passage 20A in such a manner to make a clearance 37A between the return bore 8A and the sleeve 7A. The sleeve 7A is constituted with fore and aft circular ends 27A, a pair of stiff columns 26A extending between the fore and aft circular ends 27A, a pair of flexible columns 25A extending between the fore and aft circular ends 27A, lengthwise slits 9A lying between the flexible columns 25A and the stiff columns 26A, and complementary ends 34A made on the terminals of the fore and aft circular ends 27A. The sleeve 7A is made up of a pair of sleeve halves each of which is prepared by equally dividing the flexible columns 25A at a widthwise middle thereof. Thus, the sleeve 7A is made in an integral cylinder in which the sleeve halves come into mating each other on mating surfaces 40A. The flexible column 25A at the lengthwise middle thereof has a raised portion 37a to provide an adequate spring property in such a manner making a clearance between itself and the return bore 8A. The sleeve 7A fits into the return bore 8A to provide the return passage 20A. Even if the rollers 10 have been stranded while rolling through the return passage 20A, the raised portion 37a makes abutment against the inside circular wall around the return bore 8A to protect the sleeve 7A against more bending or warp. With the small-sized linear motion guide unit, because the slider is less in length, there causes another major question in which the sleeve, as inevitably small or short in construction and thinner in thickness, is less in durability and difficult to suffer deformation, thereby unsuited to alleviate any frictional resistance caused by the rollers and, therefore, the slider would suffer large variation in sliding resistance. On the other hand, even when the flexible column 25A of the sleeve 7A is made thin too much in thickness, the flexible column 25A gets warp or bending excessively. Thus, there causes a further problem in which the rollers 10 deviate up and down in the sleeve 7A over a large variation deviation, thereby apt to get clogging up the sleeve 7A.

With the prior linear motion guide unit disclosed in one of commonly-assigned patent application, a separate adjuster cover 54 as shown in FIGS. 24 to 27 fits into a clearance 37B lying between a return bore 8B and a thin sleeve 7B. The sleeve 7B is composed of forward and aft circular ends 27B, a pair of stiff columns 26B extending between the forward and aft mating circular ends 27B, a pair of flexible columns 25B extending between the forward and aft mating circular ends 27B, lengthwise slits 9B lying between the flexible columns 25B and the columns 26B, and complementary forward and aft mating edges 34B. Moreover, the sleeve 7B is made up of two longitudinal halves, which join together on their mating lengthwise surfaces 40B lying on the flexible column 25B at the lengthwise middle thereof to complete an integral cylinder. The flexible column 25B at the lengthwise middle thereof has a raised portion 53B, which fits into a central aperture 55 in the adjuster cover 54. The adjuster cover 54 lies between the return bore 8B and the outside surface 56 of the flexible column 25B so as to serve as a cushioning member to control an amount of elastic deformation of the sleeve 7B to back up the sleeve 7B. With the sleeve 7B which fits into the return bore 8B in the carriage 3B to define the return passage 20B as constructed as stated earlier, there causes a question in which the rollers 10 are apt to clog up while rolling through the return passage 20B and in doing so the rollers 10 run through the sleeve with deflecting much up and down. To cope with this, the adjuster cover 54 is to come into abutment against the return bore 8B to prevent the flexible column 25B from deflecting much up and down. With the linear motion guide unit constructed as stated earlier, moreover, the flexible column 25 B of the sleeve 7B has a recess into which the cover of porous compact fits to apply lubricant into the return passage 20B, thereby realizing maintenance-free operation for lubrication. However, the sleeve 7B constructed as stated earlier increases in number of parts and components, thereby giving rise to higher cost for the linear motion guide unit itself. Moreover, even if the cover 54 has been forgotten to set it inside the return bore 8B, there causes is a question in which the flexible column 25B of the sleeve 7B experiences excessive warp or deflection because there is devoid of the cover 54 whereby the rollers 10 get clogged up in the return passage 20B.

SUMMARY OF THE INVENTION

The present invention has for its primary object to overcome the major challenges as stated earlier, and further to develop a linear motion guide unit which is small-sized or compact in construction. More particularly, the present invention provides a sleeve or tubular member for the preparation of a return passage suitable for a slider small-sized and reduced in the overall length to realize the linear motion guide unit which is small-sized or compact in construction. A sleeve to define a return passage fits into a lengthwise bore formed in a carriage of a slider. The sleeve has forward and aft ends, and a pair of stiff columns and a pair of flexible columns both of which extend lengthwise between the forward and aft ends, the stiff columns and the flexible columns being spaced away circularly from each other at regular intervals around the circumferential surface of the sleeve. The flexible column has a succession of raised lands and recessions or valleys which are arranged alternately in a lengthwise direction to make sure of smooth rolling movement of the rollers along the return passage. The recessions to separate the raised lands from each other in the flexible column as stated earlier suffer successively elastic deformation even under any small load to make the elastic deformation to alleviate the frictional resistance that is encountered when the rollers roll through the return passage, thereby carrying out smooth circulating movement of the rollers. Moreover, the raised lands are to make the amount of elastic deformation less at a time to make certain of the rigidity of stiffness of the flexible column. The stiff columns are made between the flexible columns to give the stiffness or rigidity to the sleeve to thereby make sure of durability and flexibility of the sleeve. The present invention, moreover, has for its object to exclude the production of inferior sleeve in which the rolling wall surface on the flexible column to come into rolling contact with the rollers, upon molding procedure, is formed to have a longitudinal contour of arc having a large radius of curvature, but after having molded, suffers shrinkage to collapse into the return passage to narrow or reduce the return passage, thereby hindering the movement of the rollers.

Means to Solve the Problems

The present invention is concerned with a linear motion guide unit comprising an elongated guide rail having a first raceway groove extending lengthwise of the guide rail and a slider allowed to move relatively to the guide rail by virtue of more than one rolling element of roller, the slider including a carriage made thereon with a second raceway groove lying in opposition to the first raceway groove to form a load race between them and further made therein with a return passage extending in parallel with the load race, end caps secured to forward and aft ends of the carriage and each made therein with a turnaround passage to connect the load race and the return passage with one another, and a plurality of rollers allowed to roll through a circulating circuit composed of the load race, return passage and a pair of the turnaround passages, the return passage being defined with a lengthwise sleeve inserted in a through-bore formed in the carriage;

wherein the sleeve has a lengthwise hole extending across overall length of the sleeve to provide the return passage, and further the sleeve is constituted with fore and aft circular ends, a pair of columns extending lengthwise between the fore and aft circular ends in opposition to each other to guide axially opposite ends of the roller, a pair of flexible columns lying between the columns and extending lengthwise between the fore- and aft circular ends in opposition to each other to make rolling contact with a rolling surface of the roller, lengthwise slits lying between the flexible columns and the columns, and second complementary ends made on the terminals of the fore and aft circular ends to make complementary fits with first complementary parts on ends of the end caps; and wherein the flexible column has raised lands and recessions which are arranged alternately in a lengthwise direction to make elastic deformation of the flexible column easier, the raised lands each having an outside curved surface spaced away from an inside circular surface of the through-bore in the carriage to form a clearance of a preselected interval lying between the carriage and the raised land of the flexible column, and the recessions each having a bottom surface spaced apart from the rolling wall surface of the return passage by a preselected thickness.

In the present invention, the linear motion guide unit is disclosed in which the sleeve has the lengthwise hole of rectangular shape in transverse section so that the rolling surface of the roller comes into rolling contact with flat rolling wall surfaces of the flexible columns opposed to each other and the axially opposite ends of the roller make sliding contact with inner flat guiding wall surfaces of the opposed columns. Moreover, the raised lands and the recessions on the flexible columns opposed to each other are face to face with each other.

In the present invention, the linear motion guide unit is disclosed in which the flexible column has a width dimension less than an axial length of a circular rolling surface of the roller rolling through the return passage and the column has a width dimension less than a diametral dimension of one of the axially opposite ends of the roller rolling through the return passage and further in which there is provided a lengthwise slit lying between the flexible column and the column adjacent to each other.

In the present invention, the linear motion guide unit is disclosed in which the raised lands and the recessions are arranged alternately in a lengthwise direction and spaced away from each other at preselected intervals. Moreover, an interval between the adjoining raised lands is made substantially equal with the diametral dimension of the roller rolling through the return passage.

In the present invention, the linear motion guide unit is disclosed in which the sleeve is constituted with a pair of flexible columns each of which is lengthwise divided into a pair of sleeve halves at widthwise middle mating surfaces thereof, the sleeve halves being jointed together on their mating surfaces and in which on any one of the mating surfaces, reentrants are made at any one of the forward and aft ends of the mating surfaces and on the other mating surface, there are made salients complementary to the reentrants at the other ends.

In the present invention, the linear motion guide unit is disclosed in which the rolling wall surface in the return passage defined inside the flexible column more rises or bulges in a middle area than in opposite ends of the return passage to make sure of smooth rolling of the rollers in the return passage. Moreover, the rolling wall surface defined inside the flexible column rises or bulges up substantially by a preselected range of from 0.05 mm to 0.1 mm above the opposite ends of the return passage. The raised land on the flexible column of the sleeve has a leading profile or slope and a trailing profile or slope tilt towards each other in the lengthwise direction of the sleeve so as to make an angle of substantially 30°.

Effect of the Invention

With the linear motion guide unit constructed as stated earlier, the sleeve is constituted with the pair of stiff columns and the pair of flexible columns which are arranged to form the lengthwise slits lying between the adjacent stiff column and flexible column. Existence of the slits helps the pair of flexible columns to undergo the elastic deformation up and down. Thick stiff columns flanked by the flexible columns make sure of durability or endurance of the sleeve. Among the raised lands and the recessions or valleys arranged alternately each other on the flexible columns, the raised lands are sure of the stiffness or rigidity of the sleeve while the recessions make the sleeve easier to suffer elastic deformation. Thus, the flexible columns in the sleeve suffer the elastic deformation up and down to alleviate the frictional resistance that is encountered when the rollers roll through the sleeve, thereby helping smooth rolling movement of the rollers and consequently making sure of better sliding movement of the slider relative to the guide rail. With the sleeve having the raised lands and the recessions on the flexible columns, the clearance between the wall surface inside the through-bore in the carriage and the outside curved surfaces of the raised lands of the sleeve may be adequately regulated depending on the dimension of the raised land to control the deformation of the flexible columns in the sleeve less, thereby getting the rolling walls of the sleeve undergoing the elastic deformation bit by bit at the locations of recessions to expand the return passage for the respective rollers. As a result, the rollers are kept against occurrence of clogged phase of the rollers, which would be caused by frictional resistance among the rollers. With the raised lands and the recessions made alternately each other on the flexible columns of the sleeve, as the recession flanked by the raised lands is allowed to suffer the elastic deformation even after the flexible column has expanded all over the flexible column, the frictional resistance that is encountered when the rollers roll through the return passage becomes less. Moreover, when the force to expand the sleeve is less, the recession is easier to suffer the elastic deformation and further easier to alleviate the frictional resistance encountered when the roller rolls through the return passage. In addition, when the frictional resistance encountered when the roller rolls the return passage gets larger and the force on the sleeve gets larger, the resistance against the load on the sleeve gets larger and correspondingly the amount of elastic deformation gets less to prevent the clogged phase caused by friction among the rollers. Moreover, the rolling wall surface in the return passage defined inside the flexible column of the sleeve more slightly rises or bulges in the middle than in the opposite ends of the return passage. More especially, the flexible column extending between the circular ends, upon molding procedure, gets bulged slightly at the middle in the lengthwise direction thereof to make the rollers easier to enter into the return passage and further make sure of smooth rolling of the rollers in the return passage.

With the linear motion guide unit of the present invention, the width dimension of the top on the raised land is made less than the diametral dimension of the roller, for example, made in about 40% of the diametral dimension of the roller. An amount of the clearance between the raised land on the flexible column and the circular inside wall surface around the through-bore in the carriage is set so as to allow the elastic deformation of the flexible column up to allowable contracted distance between the rollers. With the linear motion guide unit constructed as stated earlier, the construction of the sleeve to define the return passage has no need of a cover around the outer circumference of the sleeve as in the conventional clearance adjuster part to adjust the clearance between the through-bore in the carriage and the outside circumference of the sleeve. This results in reduction of required parts and prevention of generation of inferior goods. Moreover, because the rolling wall surface of the sleeve gets somewhat bulged into an arched contour in the lengthwise direction of the sleeve, even if the rolling wall surface of the flexible column, upon molding procedure of the sleeve, suffers shrinkage deformation, the rolling wall surface is kept against the collapse into the return passage, so that the interval across the opposite rolling wall surfaces is kept against getting so narrower or more reduced than the diameter of the roller as to make the roller tougher to roll through between the rolling wall surfaces opposite to each other across the return passage. Thus, there is no fear of the frictional resistance encountered when the rollers roll through return passage.

DETAILED DESCRIPTION OF THE PREFERRED EMBODIMENTS

The linear motion guide unit according to the present invention is adapted for use in any relatively sliding components in machinery as diverse as semiconductor manufacturing machines, precision machines, medical instruments, various robots, a diversity of assembling machines, and so on. Referring now in detail to the drawings, the linear motion guide unit according to the present invention will be explained below.

Figure 1:
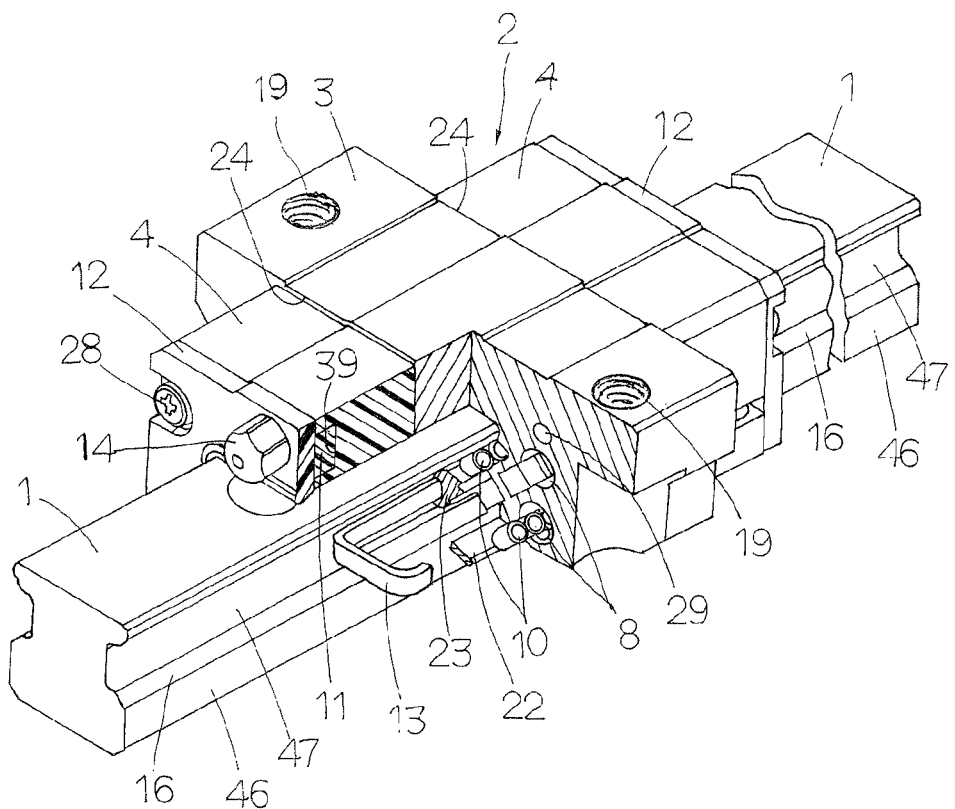
FIG. 1 is a partially cutaway view in perspective of a preferred embodiment of a linear motion guide unit according to the present invention.
Figure 2:
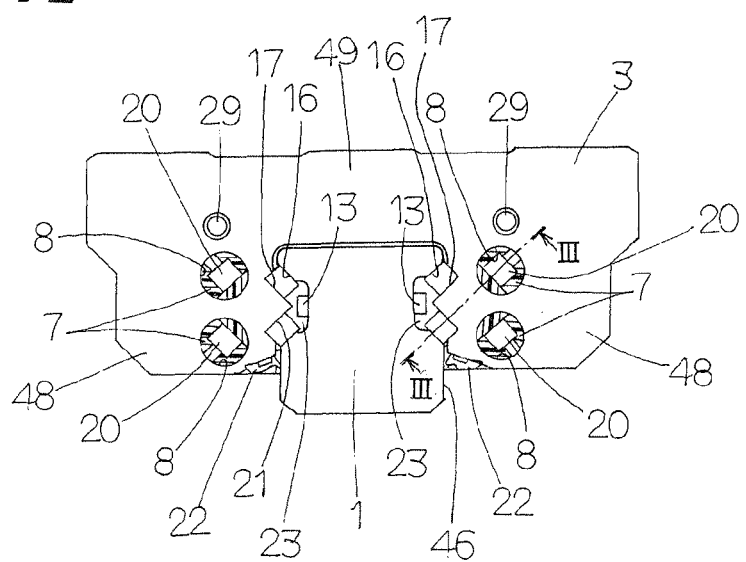
FIG. 2 is a view in front elevation of a carriage and a guide rail, where an end cap is removed from the linear motion guide unit of FIG. 1.
Figure 3:
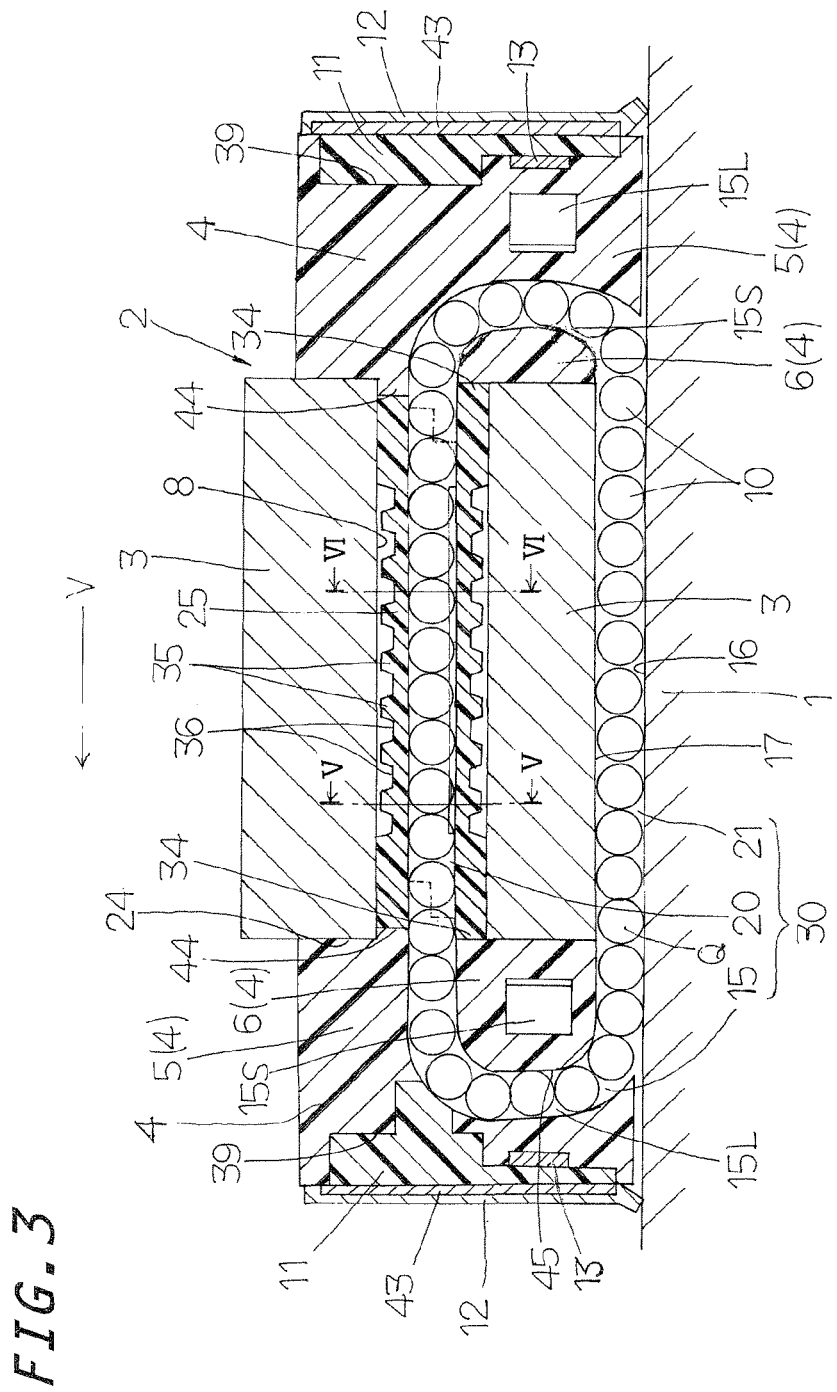
FIG. 3 is a view in transverse section taken along a plane of the line III-III of FIG. 2 to show in detail a circulating circuit in a slider.
Figure 4:
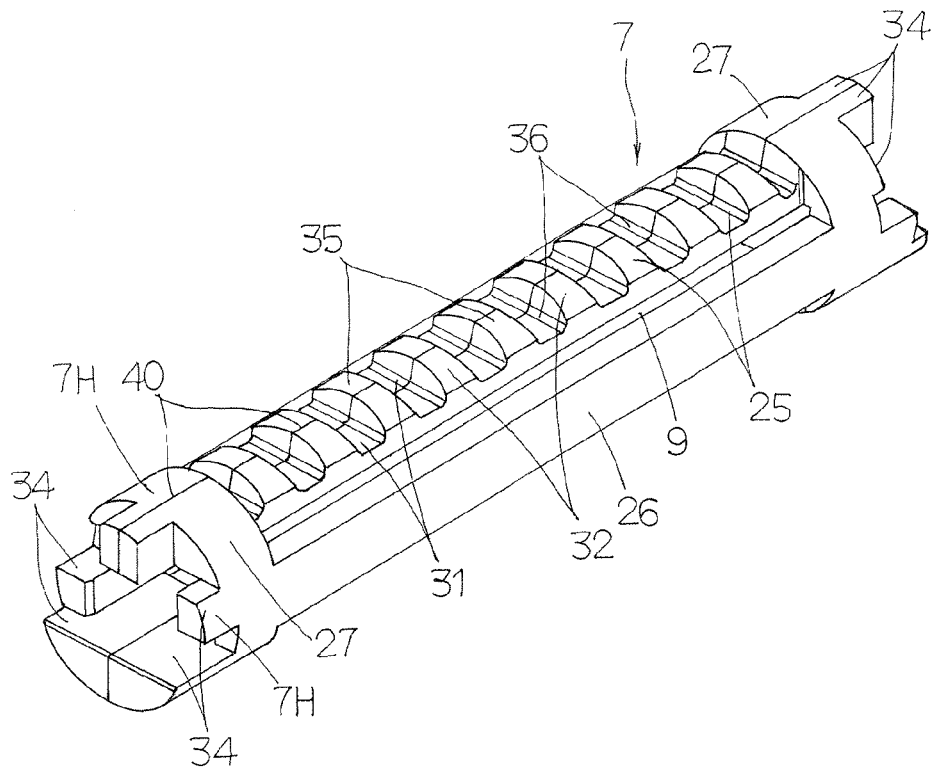
FIG. 4 is a view in perspective of a sleeve to be incorporated in the linear motion guide unit of FIG. 1.
Figure 5:
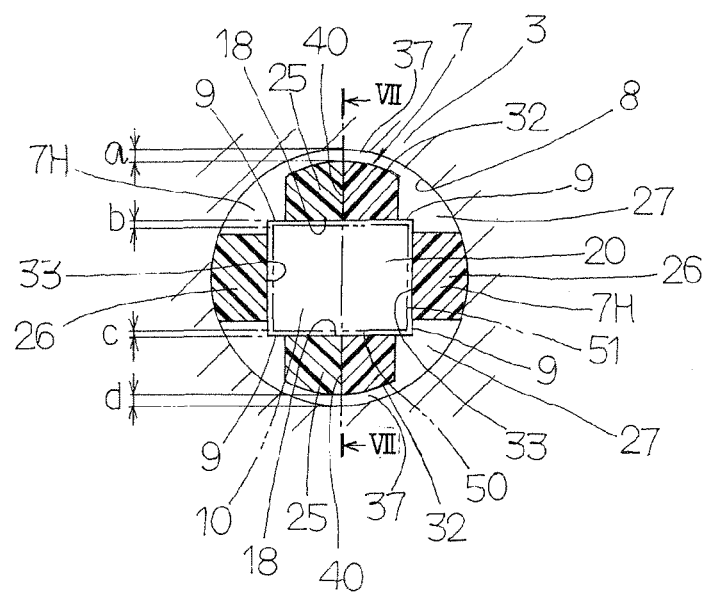
FIG. 5 is a view in transverse section of the sleeve and taken on the plane of the line V-V of the sleeve in the slider of FIG. 3.

With the linear motion guide unit of the present invention, as shown in FIGS. 1 to 3, rolling elements are cylindrical rollers 10 rolling through four rows of circulating circuits and a guide aril 1 is about 15 mm in width. A slider 2 is of flange type of compact construction short in length. The slider 2 has sidewise bulges on which fastening bolt holes spaced sidewise from each other are made to mount any other instruments on the slider. The linear motion guide unit of the present invention is mainly comprised of an elongated guide rail 1 provided on each lengthwise side 46 thereof with a lengthwise recess 47 which has a pair of first races 16, and a slider 2 which fits over or conforms to the guide rail 1 for sliding movement relative to the guide rail 1 through more than one roller 10 serving as rolling elements. The slider 2 includes a carriage 3 having second races 17 lying opposed to the first races 16 of the guide rail 1 to define load-carrying passages 21 between the first races 16 and the second races 17 and further having a pair of return passages 20 of non-loaded races, and end caps 4 fastened to opposite ends 24 of the carriage 3, the end caps each having a pair of turnaround passages 15 of arced non-loaded races. More than one roller 10 is allowed rolling through looped circulating circuits 30 each of which is made up of the load-carrying passage 21, return passages 20 and the pair of turnaround passages 15. The carriage 3 has sidewise opposite bulges 48, each of which has a pair of through-holes 8 into which the sleeves 7 fit to extend lengthwise of the carriage 3. The sleeve 7 has the return passage 20 of rectangular shape in transverse section to allow the rollers 10 to roll through there.

With the linear motion guide unit of the present invention, the carriage 3 as shown in FIG. 2 is composed of a major part 49 lying above the guide rail 1 and sidewise bulges 48 extending from widthwise opposite ends of the major part 49 downwards along the sides 46 of the guide rail 1 to fit over or conform to guide rail 1. Moreover, there are provided two load-carrying passages 21 for each sidewise bulge 48, in all, four load-carrying passages 21 for both sidewise bulges 48. Each load-carrying passage 21 is connected with the turnaround passage 15, respectively, which in turn communicates with the return passage 20, to thereby complete a pair of the looped circulating circuits 30 each of which is made up of the load-carrying passage 21, return passages 20 and the pair of turnaround passages 15. With the linear motion guide unit constructed as stated earlier, the rollers 5 rolling through one of the paired circulating circuits 30 in the bulge 48 of the carriage 3 are allowed to transfer from a downside load-carrying passage 21, which suffers any downward load of the slider 2, into the associated upside return passage 20. In contrast, the rollers 5 rolling through the other of the paired circulating circuits 30 are allowed to transfer from an upside load-carrying passage 21, which suffers any upward load of the slider 2, into the associated downside return passage 20. The linear motion guide unit constructed as stated earlier, as shown in FIGS. 1 to 3, has an end seal 12 secured to an outward surface of the end cap 4. The end seal 12 is reinforced with a metallic core 43 and provided thereon with a lip to seal any clearance left between the slider 2 and the guide rail 1. Moreover, a lower seals 22 are placed between carriage 3 and the end caps 4. With the slider 2 constructed as stated earlier, fastening bolt 28 is driven or tightened into a threaded hole 29 of the carriage 3 after extended across the end seal 12 and the end cap 4, thereby tightening integrally the end seal 12 and the end cap 4 to the carriage 3. The guide rail 1 has some holes, not shown, spaced at regular intervals in the lengthwise direction of the guide rail 1, the holes being used to fasten the guide rail 1 to any stationary bed including machine bed, mounting base, and so on. The carriage 3 has fastening threaded holes 19 which are used to connect any counterpart including instruments, work, and so on. The end cap 4 is composed of an end cap major part 5 to define an outside circular half of the turnaround passage 15, and a spacer part 6 to define an inside circular half of the turnaround passage 15.

With the linear motion guide unit of the present invention, the turnaround passages 15 in each sidewise bulge in the end cap 4 get intersected at right angles each other and staggered relative to each other. The turnaround passages 15 in the sidewise bulges of the end cap 4, as shown in FIGS. 1 to 3, include outer turnaround passages 15L longer or deep in the end and cap 4 and inner turnaround passages 15S shorter or shallow in the end and cap 4, and these turnaround passages 15L and 15S are made crossed or staggered one another in each one of sidewise bulges the caps 4. One of the pair of looped circulating circuits 30 consists of the longer turnaround passage 15L, load-carrying race 21 and the shorter turnaround passage 15S and the other of the pair of looped circulating circuits 30 consists of the shorter turnaround passage 15S, load-carrying race 21 and the longer turnaround passage 15L. The roller 10 rolling through the load-carrying race 21 is a cylinder having a circular surface 50 making rolling contact with the looped circulating circuit 30 and axially opposite ends 51. A retainer plate 23 is installed to make sliding contact with any one of the axially opposite ends 51 of the roller 10 to keep the rollers 10 against falling away from the slider 2 even after the slider 2 has taken away from the guide rail 1. The retainer plate 23 is kept between the second races 17 of the carriage 3 by means of a retaining band 13 making engagement at opposite ends thereof with notches cut in the end caps 4 of the slider 2. With the linear motion guide unit constructed as stated earlier, a grease nipple 14 is attached to the outward surface of the end seal 12. The end cap 4 as shown in FIGS. 1 to 3 has a recess 39 made on a surface thereof opposite of the carriage 3 and a lubricant reservoir 11 impregnated with lubricating material fits in the recess 39. The lubricant reservoir 11 has an applicator nose exposed to the associated turnaround passage 15. The lubricant reservoir 11 is exposed to the longer turnaround passage 15L of the turnaround passages 15 through the outer circular wall surface of the turnaround passage 15L to make application of lubricant around the rollers 10 while they roll through the turnaround passage 15. A lubricating member of the lubricant reservoir 11 is made of a porous compact of synthetic resinous material made of, for example, finely powdery ultrahigh molecular weight synthetic resin, which is first subjected to compacting and the resulting compact is subsequently sintered at elevated temperature to provide open-porous or open-cellular texture whose pores or cells preserved among fine particles are open each other through interstices or channels, so that the porous compact is impregnated with lubricant. With the linear motion guide unit constructed as stated earlier, thus, the rollers 10 after fed with lubricant while rolling through the turnaround passages 15 are allowed to make lubrication of the load-carrying passages 21 while rolling through the load-carrying passages 21. As a result, the linear motion guide unit of the present invention, even if compact in construction and small-sized in length, makes it possible to preserve much amount of lubricant therein, thereby realizing the maintenance-free operation for lubrication.

The linear motion guide unit of the present invention especially features the sleeve 7 which fits into the through-bore 8 in the carriage 3 to provide the turn passage 20 extending across the overall length of the carriage 3. The sleeve 7 is made small-sized or compact in construction of synthetic resinous material which may easily suffer elastic deformation. The sleeve 7, especially shown in FIGS. 4 to 19, is composed of circular parts 27 lying opposite to each other lengthwise of the sleeve 7, a pair of stiff columns 26 extending between the circular parts 27 and lying opposed radially of the sleeve 7 to guide the axially ends 51 of the roller 10, a pair of flexible columns 25 extending between the circular parts 27 and lying opposed radially of the sleeve 7 midway between the stiff columns 26 to guide the rolling surface 50 of the roller 10, lengthwise slits 9 lying between the stiff columns 26 and the flexible columns 25, and complementary mating ends or second mating ends 34 lying at foremost edges of the circular parts 27 to make complementary engagement with other complementary mating ends or first mating ends 44 formed on an end surface of the end cap 4. The flexible column 25 has a succession of raised lands 35 and recessions or valleys 36 which are arranged alternately in a lengthwise direction to make it easier to suffer elastic deformation. More especially, the raised lands 35 each have an outer convex surface 32 spaced away from an inside diameter of the through-bore 8 in the carriage 3 at a predetermined clearance 37. The recession or valley 36 lying between the adjacent raised lands 35 has a bottom surface 31 spaced apart from a rolling wall surface 18 of the return passage 20 by a preselected thickness. With the linear motion guide unit constructed as stated earlier, moreover, the sleeve 7 has the through-bore of rectangular shape in transverse section so that the rolling surface 50 of the roller 10 makes into rolling contact with flat rolling wall surfaces 18 of the opposed flexible columns 25 and the axially opposite ends 51 of the roller 10 make sliding contact with inner flat guiding wall surfaces 33 of the opposed stiff columns 26.

Figure 7:
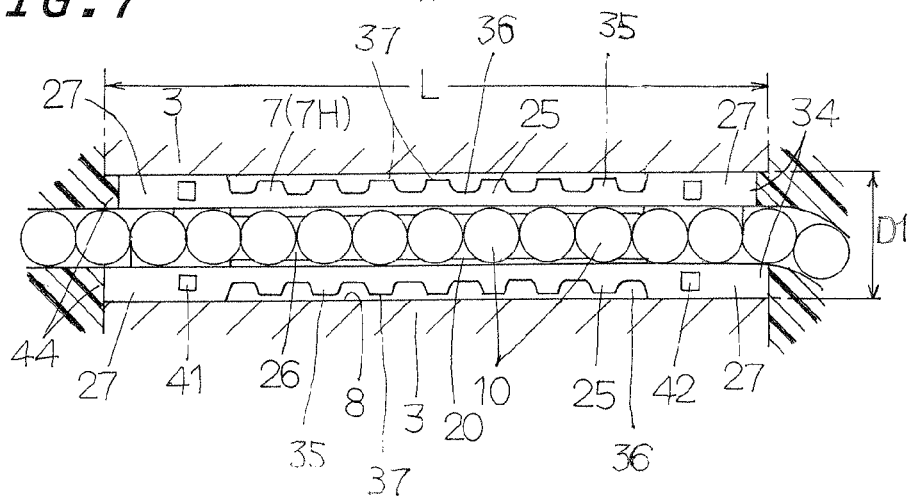
FIG. 7 is a view in transverse section of the sleeve, the view being taken on the plane of the line VII-VII of FIG. 5 along mutually mating surfaces of lengthwise halves of the sleeve.

Referring to FIG. 7, there is shown the return passage 20 in which the rollers 10 are allowed to roll smoothly with causing no clogging and, therefore, the flexible columns 25 experience no elastic deformation. In contrast, the rollers 10 in FIG.

Figure 8:
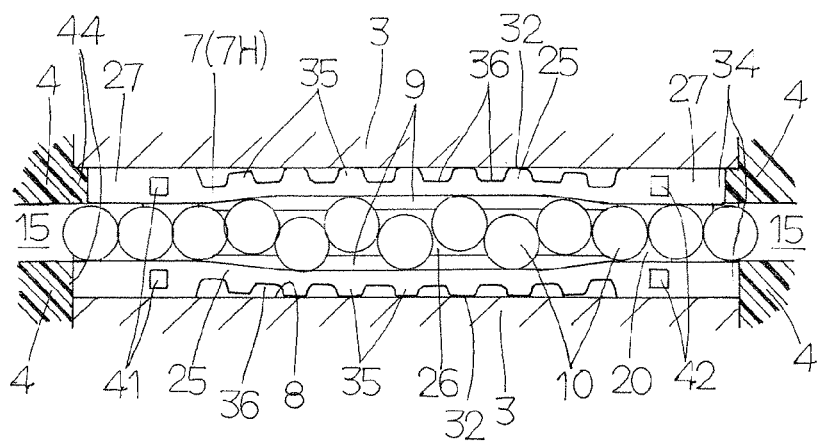
FIG. 8 is a view in transverse section of the sleeve, the view illustrating exaggeratedly a phase where a flexible column of the sleeve suffers elastic deformation after the rollers have clogged the return passage.
Figure 9:
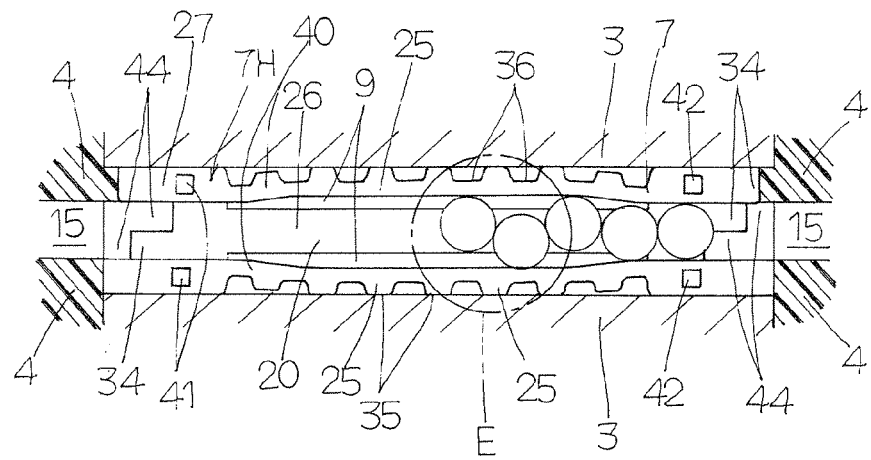
FIG. 9 is a view in transverse section of the sleeve, the view illustrating exaggeratedly a phase where a flexible column of the sleeve suffers more elastic deformation than the phase shown in FIG. 8.

8 are shown clogged in the sleeve 7 with the flexible columns 25 being subject to the elastic deformation. After the flexible columns 25 as shown in FIG. 8 are as a whole subject to expansion radially outwards of the sleeve 7, each of the recessions 36 flanked with any two raised lands 35 becomes easy to suffer elastic deformation under even any small stress of force, so that the flexible columns 25 make expansion radially outwards of the sleeve 7. With the linear motion guide unit shown in FIG. 9, when the flexible columns 25 suffer more stress or load, though the recessions 36 flanked with any two raised lands 35 suffer the elastic deformation, the raised lands 35 lying on opposite sides of the recession 36 shows a large resisting force against any external force and therefore, an amount of elastic deformation in the flexible columns 26 lessens to control the elastic deformation of the flexible columns 26 so as to keep the rollers 10 against too clogging in the return passage 20. With the embodiment of the sleeve 7 shown in FIGS. 6 and 7, for instance, the outside circumference of the circular part 27 had a diameter D1 of 4.6 mm, the length L of the sleeve 7 was 24 mm, the shorter side H of the rectangular shape of the through-bore was 2.1 mm and a longer side W thereof was 2.6 mm. With the sleeve 7, moreover, the raised lands 35 and the recessions 36 on the opposing flexible columns 25 are face to face with each other. The width of the flexible column 25 is made less than the axial length of the rolling surface 50 around the roller 10 and the width of the stiff column 26 is made less than the diametral dimension of the circular end 51 of the roller 10 rolling through the return passage 20. In other words, the width dimension between the opposed flexible columns 25 or the shorter side H is somewhat larger than the diametral dimension of the roller 10 and the width dimension between the opposed stiff columns 26 or the longer side W is somewhat larger than the axial length of the roller 10. Moreover, the width dimension of the stiff column 26 is slightly less than the diametral dimension of the roller 10 or the length of one of the axially opposite ends of the roller 10 and the width dimension of the flexible column 25 is slightly less than the axial length of the circular rolling surface 50 of the roller 10. As a result of the dimensional relations as stated earlier, there are provided lengthwise slits 9 between the flexible columns 25 and the stiff columns 26. Existence of the lengthwise slits or clearances renders the flexible columns 25 easier to suffer elastic deformation.

The raised lands 35 and the recessions 36 are arranged on the flexible columns 25 at preselected intervals in the lengthwise direction. The interval between the adjoining raised lands 35 is made substantially equal with the diametral dimension of the roller 10 rolling through the return passage 20. Moreover, the raised land 35 formed on the flexible column 25 of the sleeve 7 is designed to have profiles 38 sloping in the lengthwise direction of the flexible column 25 to make it easier to get the flexible column 25 to warp or bend with smooth. A leading profile or slope 38 and a trailing profile or slope 38 tilt towards each other so as to make an angle θ. More especially, the angle θ is determined substantially 30°. The width dimension of the raised land 35 is made less than the diametral dimension of the roller 10, for example, made in about 40% of the diametral dimension of the roller.

With the linear motion guide unit constructed as stated earlier, the sleeve 7 is constituted with a pair of flexible columns 25 each of which is lengthwise divided into a pair of sleeve halves 7H at the widthwise middle mating surfaces 40 thereof. The sleeve 7 is made up of two sleeve halves 7H, which join together on their mating surfaces 40. On any one of the mating surfaces 40, reentrants 42 are made at any one of the forward and aft ends of the mating surfaces 40. In contrast, on the other mating surface 40, there are made salients 41 complementary to the reentrants 42 at the other ends 21. Upon assembly of the sleeve halves 7H to finish the sleeve 7, after getting the mating surfaces 40 faced each other in opposite direction, only fitting the salients 41 on any one of the mating surfaces 40 into their complementary reentrants 42 on the other mating surface 40 makes sure of accurate location between the sleeve halves 7A to complete the sleeve 7.

With the linear motion guide unit constructed as stated earlier, the sleeve 7 is made of synthetic resinous material which is molded as a whole. The rolling wall surface 18 in the return passage 20 defined inside the flexible column 25 of the sleeve 7 is made to more rise or bulge in the middle than in the opposite ends of the return passage 20 to make sure of smooth rolling of the rollers 10 in the return passage 20. More especially, the rolling wall surface 18 defined inside the flexible column 25 of the sleeve 7 rises or bulges up substantially by a preselected range of from 0.05 mm to 0.1 mm above the opposite ends of the return passage 20. Referring FIG. 15, there are illustrated radial dimensions between the rolling wall surfaces 18 of the flexible columns 25. Now assuming that the dimension between the radially opposed rolling wall surfaces 18 is He at a sleeve end or sleeve ingress and Hc at the middle of the return passage 20, the return passage 20 is designed that the difference between He and Hc is (Hc−He)/2=from 0.05 to 0.1 mm. The reason why the flexible column 25 gets bulged at the middle in the lengthwise direction thereof is that the rolling wall surface 18 of the flexible column 25, upon molding procedure, suffers shrinkage deformation to collapse into the return passage 20 to narrow or reduce the return passage 20, thereby hindering the movement of the rollers.

With the linear motion guide unit constructed as stated earlier, how the rollers 10 moves in succession along the sleeve 7 will be hereinafter explained with reference to the circulating circuit 30 shown in FIG. 3. The circulating circuit 30 is constituted with two linear passages of the load-carrying races 21 and the return passage 20, and curved passages of the turnaround passages 15. An amount of spacing or clearance between any two adjacent rollers 10 varies incessantly. When the slider 2 moves in an arrowed direction V, the rollers 10 lying in the non-loaded race of the turnaround passage 15L is in a condition in which they are tough to enter into an ingress area Q of the load-carrying race 21. To cope with this, the carriage 3 is machined at the ends of the load-carrying race 21 in the slider 2 to have crowing profiles to make the rollers 10 easier to enter into the ingress area Q of the load-carrying race 21. Resistance that is encountered when the roller 10 transfers from the non-loaded race of the turnaround passage 15L to the load-carrying race 21 works as a counterforce against another roller 10 succeeding the roller 10 in the non-loaded race. The successive rollers 10 lying in the non-loaded race of the return passage 20 and the turnaround passages 15L and 15S in the circulating circuit 30 suffer both a counterforce caused by the roller 10 just going to enter the load-carrying race and a pressing force that is encountered when the roller 10 transferring from the load-carrying race 21 into the non-loaded turnaround passage 15S pushes the roller 10 forward in the traveling direction. Now referring a force exerted on the roller 10 both in front and in the rear to as squeezing force, the rollers 10 kept against traveling in the direction of movement through the non-loaded race end up pressing the rolling wall surface 18 in the return passage 20, thereby urging the rolling wall surface 18 to spread out the rolling wall surface 18 alternately in the radial directions around the lengthwise middle of the sleeve 7, eventually getting the flexible column 25 to suffer elastic deformation. In other words, the flexible column 25 suffers elastic deformation to expand the intervals between the rolling wall surfaces 18, so that a distance between the centers of the adjacent rollers 10 is made contracted. As this occurred, the slider 2 is inevitably allowed to move over a distance twice as long as the contracted distance. The roller 10 which has undergone the resistance force or stress at the ingress of the load-carrying race 21 becomes allowed to enter into the load-carrying race 21 to thereby get rid of the counterforce which has worked until then on the roller 10 lying in the non-loaded turnaround passage 15L following to the roller 10 which entered the load-carrying race 21. Moreover, the roller 10 pushed or thrust from behind is free of pressing force while advancing in the traveling direction. With the linear motion guide unit constructed as stated earlier, a series of phenomena of rolling phases of the roller 10 as described above is repeatedly done whenever the roller 10 transfers from the load-carrying race 21 to the non-loaded turnaround passages 15L and 15S, and vice versa.

Figure 6:
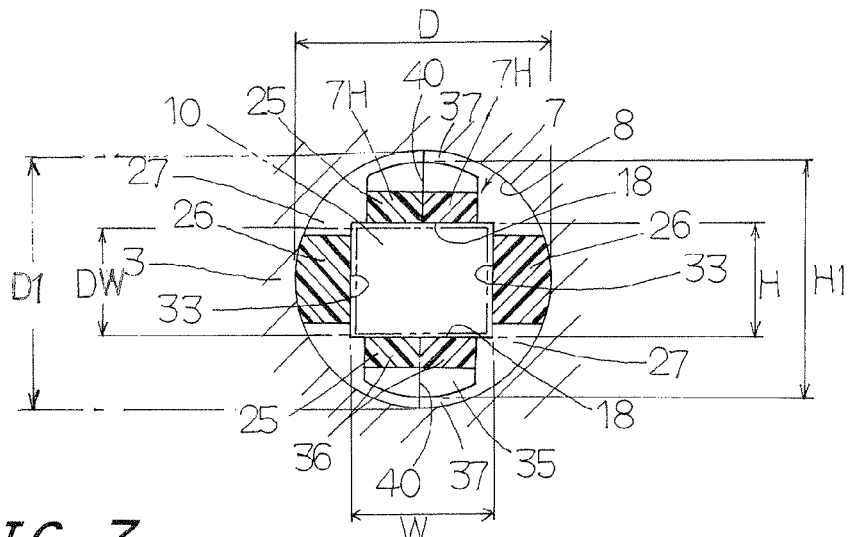
FIG. 6 is a view in transverse section of the sleeve, the view being taken on the plane of the line VI-VI of the sleeve in the slider of FIG. 3.
Figure 10:
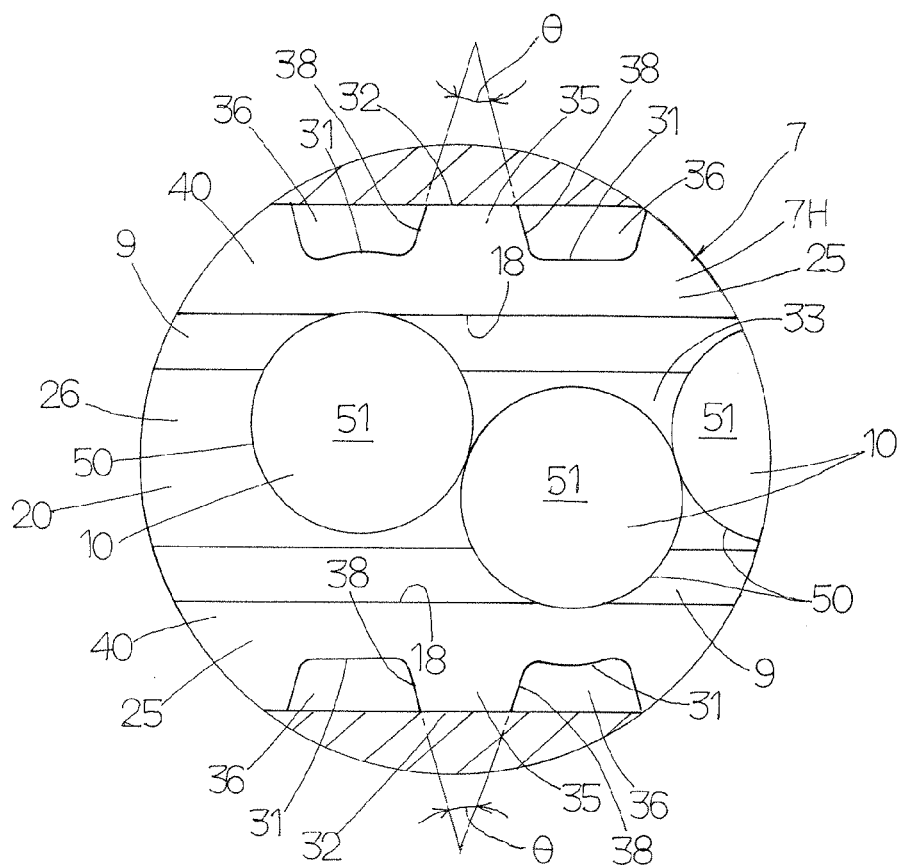
FIG. 10 is an enlarged view in transverse section of an encircled area E of FIG. 9.
Figure 11:
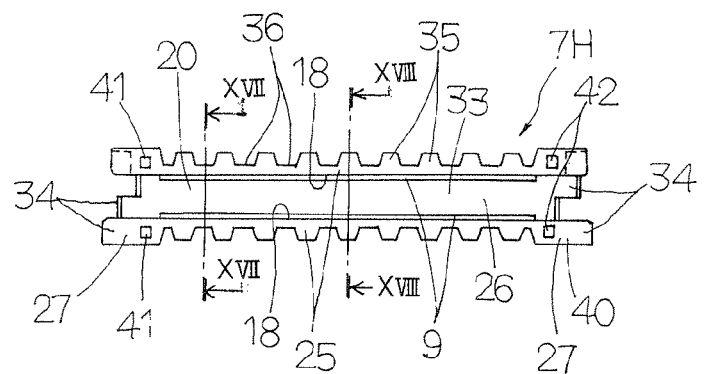
FIG. 11 is a view in side elevation of a half sleeve to complete the sleeve used in the linear motion guide unit of the present invention.
Figure 12:
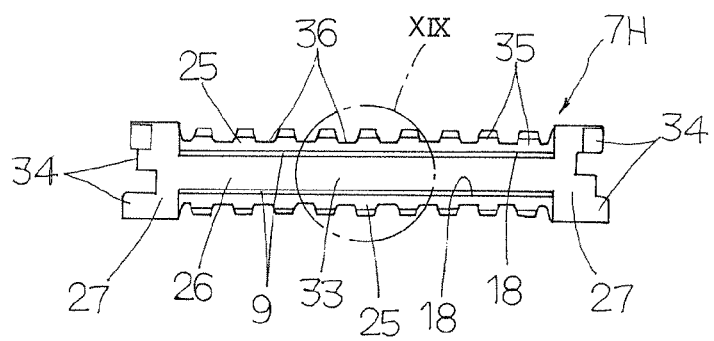
FIG. 12 is a view in side elevation of the half sleeve of FIG. 11, the view being seen from the side of a stiff column.
Figure 13:
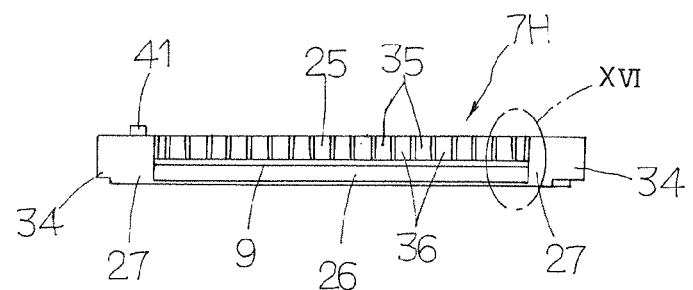
FIG. 13 is a view in side elevation of the half sleeve of FIG. 11, the view being seen from the side of a flexible column.
Figure 14:
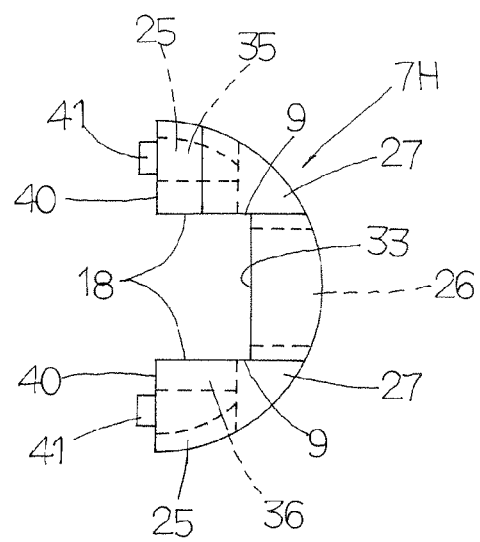
FIG. 14 is a view in end elevation of the half sleeve of FIG. 11.
Figure 15:
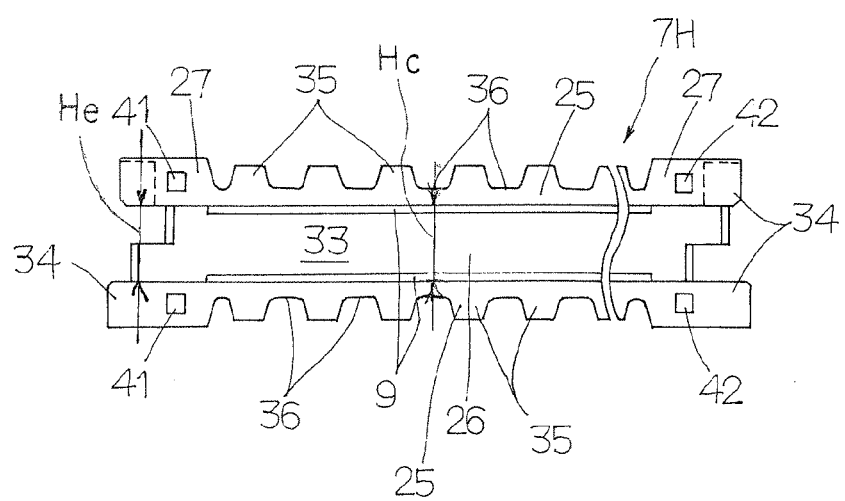
FIG. 15 is an enlarged view in side elevation of the half sleeve of FIG. 11.
Figure 16:
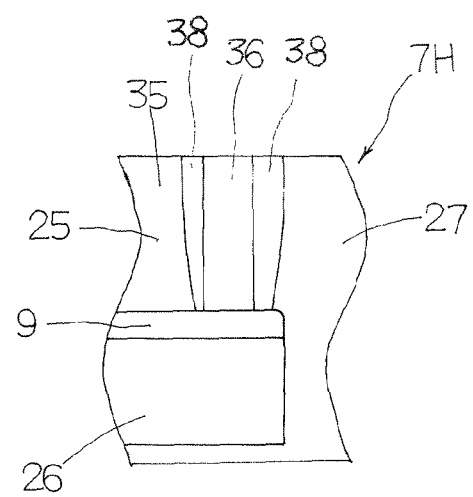
FIG. 16 is an enlarged view in side elevation showing an encircled area X VI of the half sleeve in FIG. 13.
Figure 17:
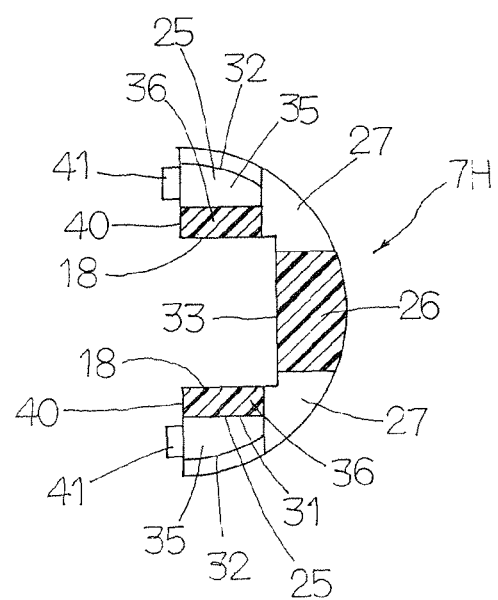
FIG. 17 is a view in transverse section of the sleeve and taken on the plane of the line X VII-X VII of the half sleeve of FIG. 11.
Figure 18:
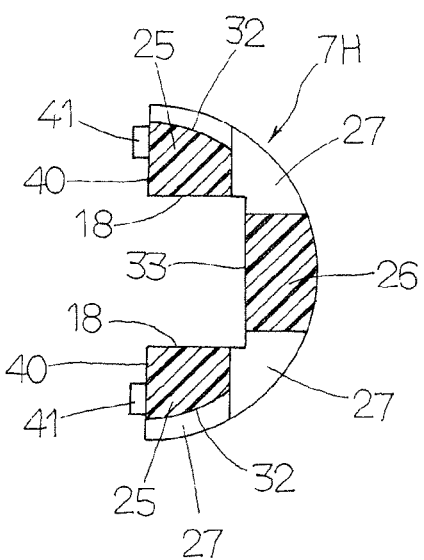
FIG. 18 is a view in transverse section of the half sleeve and taken on the plane of the line X VIII-X VIII of the half sleeve of FIG. 11.
Figure 19:
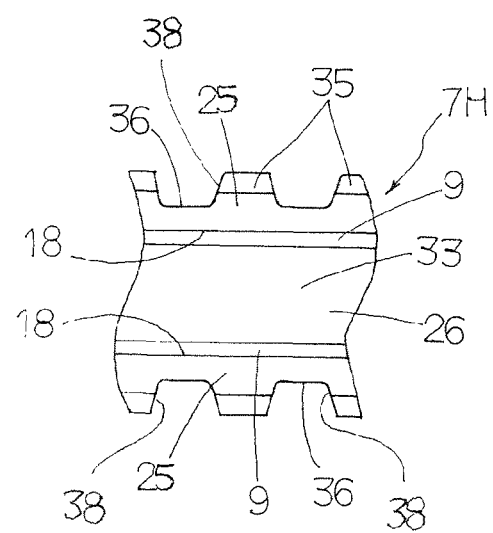
FIG. 19 is an enlarged view in side elevation showing an encircled area X IX of the half sleeve in FIG. 12.
Figure 20:
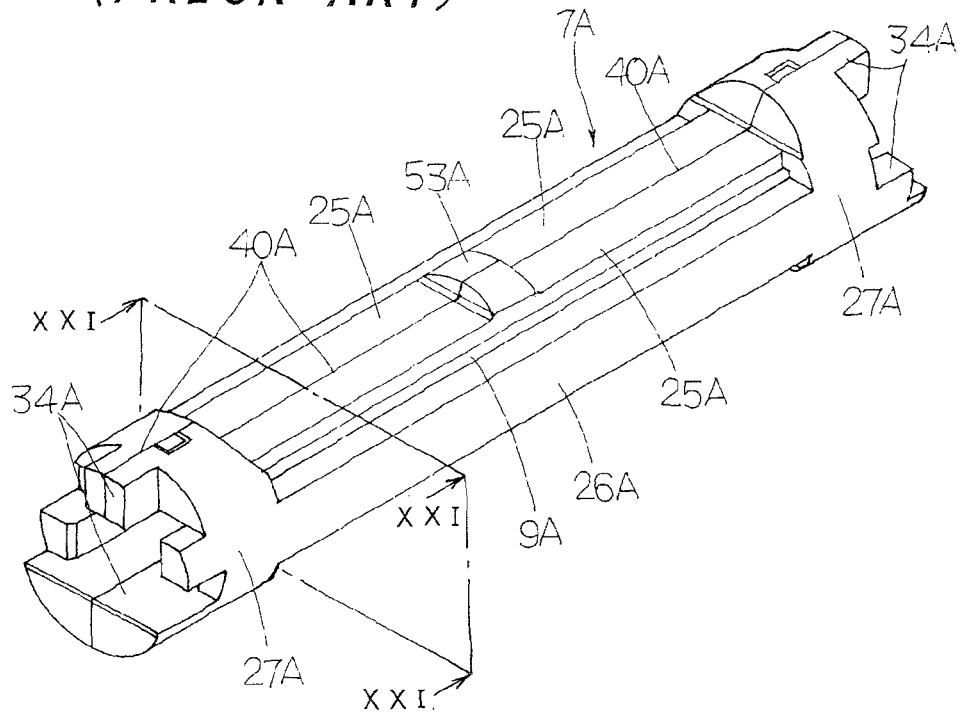
FIG. 20 is a view in perspective of a conventional sleeve to be incorporated in the linear motion guide unit.
Figure 21:
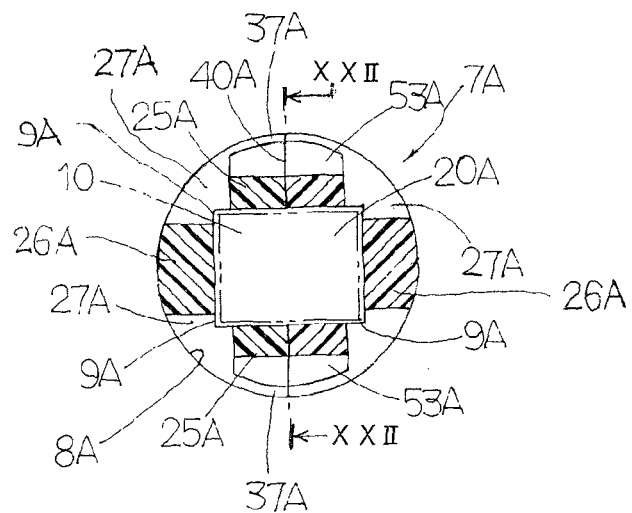
FIG. 21 is a view in transverse section of the conventional sleeve of FIG. 20 and taken on the plane of the line X X I-X X I of the half sleeve of FIG. 11.
Figure 22:
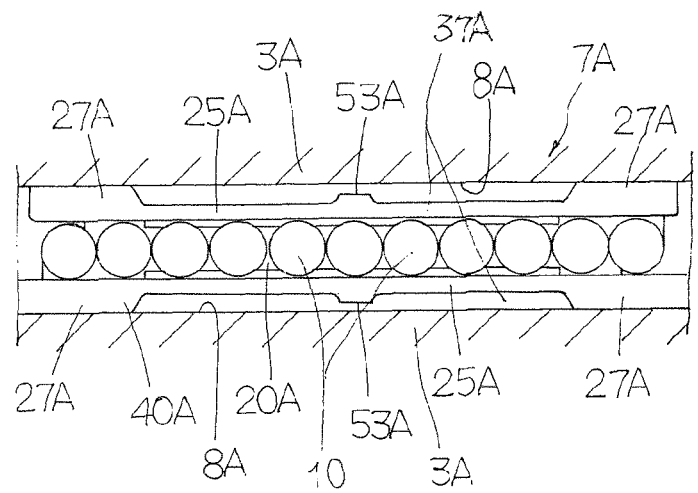
FIG. 22 is a view in longitudinal section of the sleeve of FIG. 21, the view being taken on the plane of the line X X II-X X II of the conventional sleeve or mating surfaces of the conventional sleeve halves to show a longitudinal side of the conventional sleeve.
Figure 23:
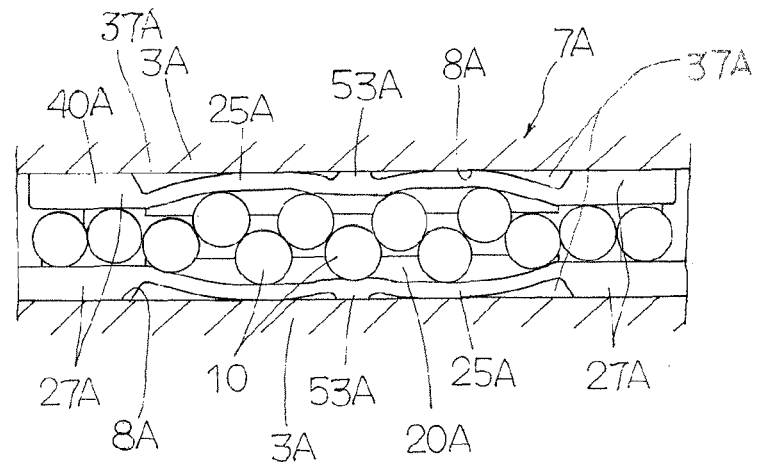
FIG. 23 is a view to explain how the flexible column of the half sleeve suffers elastic deformation after the rollers have clogged the return passage formed with the sleeve halves of FIG. 22.
Figure 24:
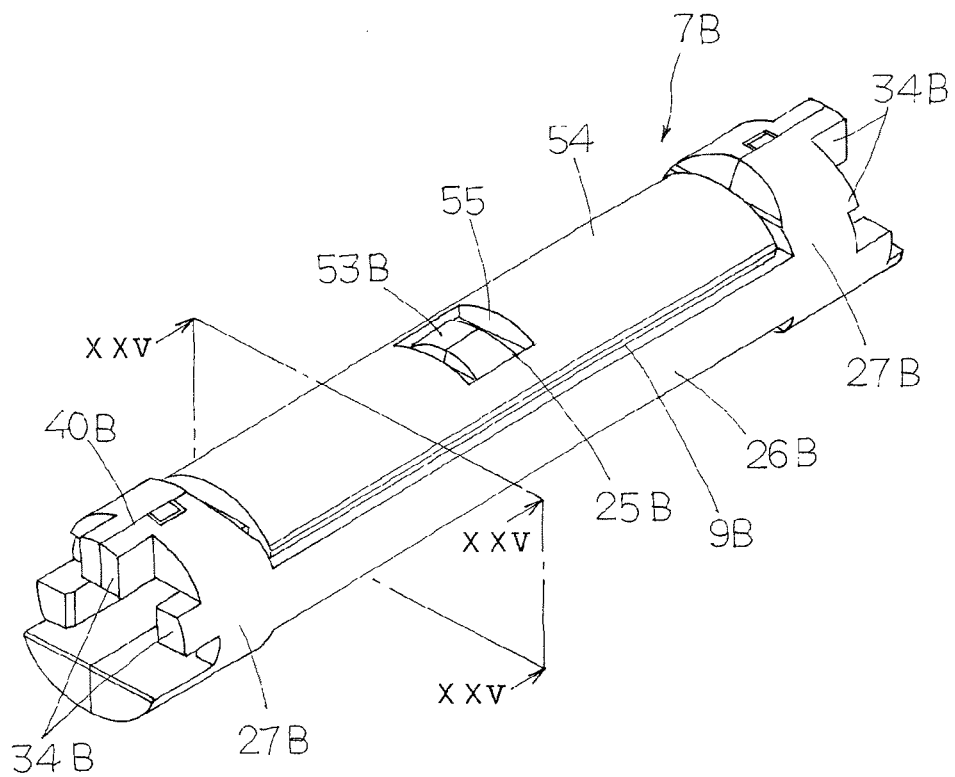
FIG. 24 is a view of perspective sowing another version of the conventional sleeve to be incorporated linear motion guide unit.
Figure 25:
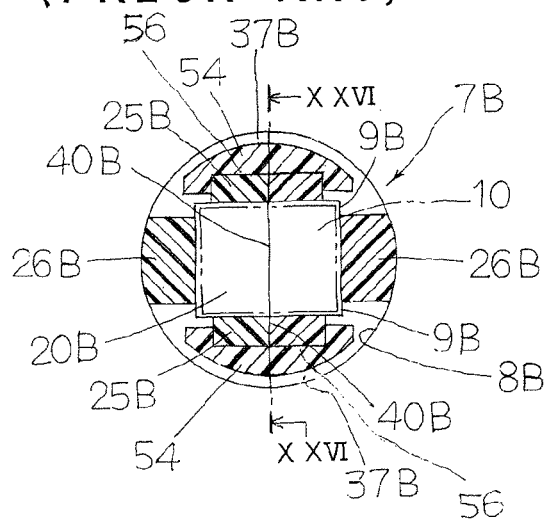
FIG. 25 is view in transverse section of the sleeve of FIG. 24, the view being taken on the plane of the line X X V-X X V of the sleeve of FIG. 24.
Figure 26:
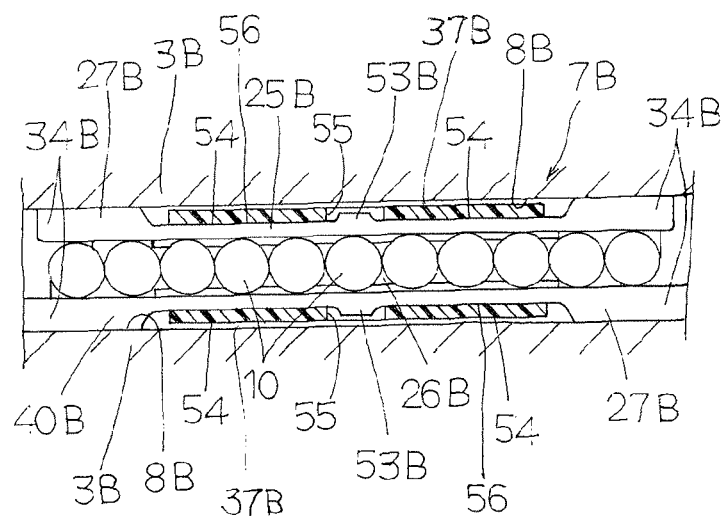
FIG. 26 is a view in longitudinal section of the sleeve of FIG. 25, the view being taken on the plane of the line X X VI-X X VI of the conventional sleeve or mating surfaces of the conventional sleeve halves to show a longitudinal side of the conventional half sleeve.
Figure 27:
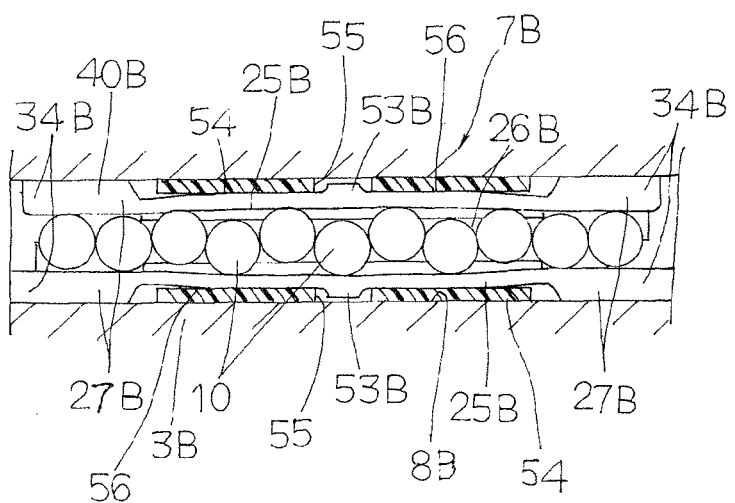
FIG. 27 is a view to explain how the flexible column of the half sleeve suffers elastic deformation after the rollers have clogged the return passage formed with the sleeve halves of FIG. 26.

The following gives the description of the elastic deformation in the sleeve 7 for the return passage 20. As the rolling wall surface 18 is urged while the rollers 10 roll through inside the return passage 20, the flexible column 25 including the rolling wall surface 18 undergoes the elastic deformation. After the return passage 20 has been more tightly clogged up with the rollers 10, the flexible column 25 suffers large elastic deformation as far as an outside surface 32 of the raised land 35 comes into contact or engagement with a circular inside surface around the through-bore 8 in the carriage 3. An amount of a clearance between the outside surface 32 of the raised land 35 and the circular inside surface around the through-bore 8 in the carriage 3 is set so as to allow the elastic deformation of the flexible column 25 up to allowable length of the roller chain. The allowable clogging of the roller chain was obtained based of the experimental results. Now assuming as shown in FIG. 6 that the outside diameter of the sleeve 7 at the location of flexible column 25 is H1, the distance between the opposed rolling wall surfaces 18 across the roller 10 is H, the diameter of the roller is DW and the diameter of the through-bore 8 in the carriage 3 is D1, the clearance (D1−H1) lying between the through-bore 8 in the carriage 3 and the flexible column 25 of the sleeve 7 is a+d, above and below across the sleeve 7 and the clearance (H−DW) lying the diameter of the roller 10 and the interval between the opposed rolling wall surfaces 18 in inside the return passage 20 is b+c, above and below across the roller 10. Thus, the overall amount of the clearances (D1−H1+H−DW) results in a+d+b+c. With the embodiment described herein, φ for example, when the diameter D1 of the roller 10 was φ 2 mm, the clearance (a+d+b+c) was 0.55 mm. When the diameter D1 of the roller 10 was φ 2.5 mm, the clearance (a+d+b+c) was 0.75 mm. When the diameter D1 of the roller 10 was φ 2.5 mm, the clearance (a+d+b+c) was 0.75 mm. When the diameter D1 of the roller 10 was φ 3 mm, the clearance (a+d+b+c) was 0.89 mm. When the diameter D1 of the roller 10 was φ 3.5 mm, the clearance (a+d+b+c) was 0.99 mm. By the way, when the return passage 20 is clogged up with excessive rollers 10, the frictional force caused among the rollers 10 outweighs the restoring force from the elastic deformation of the flexible column 25, thereby getting the rollers 10 clogged with each other to keep possibly the rollers 10 against circulating movement. With the linear motion guide unit of the present invention, because of the flexible column 25 having the raised lands 35 and the recessions 36 arranged alternately each other, the rolling wall surface 18 is easier to undergo elastic deformation at the recessions 36 as shown in FIG. 10 to get the bottom surfaces 31 of the recessions 36 bulging outwardly to thereby get rid of the clogged condition of the rollers 10 in the return passage 20. The raised lands 35 and the recessions 36 are arranged in succession alternately each other on the flexible column 25 to make less the amount of clearance between the outside surface 32 of the raised land 35 and the inside wall surface of the through-bore 8 in the carriage 3 to thereby keep the elastic deformation less. The rollers 10 lying in the non-loaded return passage 20 in the sleeve 7 suffers the urging force both in front and in the rear in the traveling direction in the phase described before. As a result that the rollers 10 as shown in FIG. 7 have been urged in the sleeve 7 both in front and in the rear in the traveling direction to get clogged with each other, the overall length of the successive rollers 10 as shown in FIG. 8 is made shorter. Nevertheless, the elastic deformation caused in the flexible column 25 as described earlier helps immediately free little by little the return passage 20 of the clogged rollers 10. With the linear motion guide unit constructed as stated earlier, the varied amount of the roller chain is dependent on the length of the return passage 20, the diameter of the roller 10, the number of the rollers 10, the clearance to permit the elastic deformation and so on.

What is claimed is:

1. A linear motion guide unit comprising an elongated guide rail having a first raceway groove extending lengthwise of the guide rail and a slider allowed to move relatively to the guide rail by virtue of more than one rolling element of roller, the slider including a carriage made thereon with a second raceway groove lying in opposition to the first raceway groove to form a load race between them and further made therein with a return passage extending in parallel with the load race, end caps secured to forward and aft ends of the carriage and each made therein with a turnaround passage to connect the load race and the return passage with one another, and a plurality of rollers allowed to roll through a circulating circuit composed of the load race, return passage and a pair of the turnaround passages, the return passage being defined with a lengthwise sleeve inserted in a through-bore formed in the carriage;

wherein the sleeve has a lengthwise hole extending across overall length of the sleeve to provide the return passage, and further the sleeve is constituted with fore and aft circular ends, a pair of columns extending lengthwise between the fore and aft circular ends in opposition to each other to guide axially opposite ends of the roller, a pair of flexible columns lying between the columns and extending lengthwise between the fore- and aft circular ends in opposition to each other to make rolling contact with a rolling surface of the roller, lengthwise slits lying between the flexible columns and the columns, and second complementary ends made on the terminals of the fore and aft circular ends to make complementary fits with first complementary parts on ends of the end caps; and wherein the flexible column has raised lands and recessions which are arranged alternately in a lengthwise direction to make elastic deformation of the flexible column easier, the raised lands each having an outside curved surface spaced away from an inside circular surface of the through-bore in the carriage to form a clearance of a preselected interval lying between the carriage and the raised land of the flexible column, and the recessions each having a bottom surface spaced apart from the rolling wall surface of the return passage by a preselected thickness.

2. The linear motion guide unit constructed as defined in claim 1, wherein the sleeve has the lengthwise hole of rectangular shape in transverse section so that the rolling surface of the roller comes into rolling contact with flat rolling wall surfaces of the flexible columns opposed to each other and the axially opposite ends of the roller make sliding contact with inner flat guiding wall surfaces of the opposed columns.

3. The linear motion guide unit constructed as defined in claim 1, wherein the raised lands and the recessions on the flexible columns opposed to each other are face to face with each other.

4. The linear motion guide unit constructed as defined in claim 1, wherein the flexible column has a width dimension less than an axial length of a circular rolling surface of the roller rolling through the return passage and the column has a width dimension less than a diametral dimension of one of the axially opposite ends of the roller rolling through the return passage and further wherein there is provided a lengthwise slit lying between the flexible column and the column adjacent to each other.

5. The linear motion guide unit constructed as defined in claim 1, wherein the raised lands and the recessions are arranged alternately in a lengthwise direction and spaced away from each other at preselected intervals.

6. The linear motion guide unit constructed as defined in claim 1, wherein an interval between the adjoining raised lands is made substantially equal with the diametral dimension of the roller rolling through the return passage.

7. The linear motion guide unit constructed as defined in claim 1, wherein the sleeve is constituted with a pair of flexible columns each of which is lengthwise divided into a pair of sleeve halves at widthwise middle mating surfaces thereof, the sleeve halves being jointed together on their mating surfaces and wherein on any one of the mating surfaces, reentrants are made at any one of the forward and aft ends of the mating surfaces and on the other mating surface, there are made salients complementary to the reentrants at the other ends.

8. The linear motion guide unit constructed as defined in claim 1, wherein the rolling wall surface in the return passage defined inside the flexible column more rises or bulges in a middle area than in opposite ends of the return passage to make sure of smooth rolling of the rollers in the return passage.

9. The linear motion guide unit constructed as defined in claim 8, wherein the rolling wall surface defined inside the flexible column rises or bulges up substantially by a preselected range of from 0.05 mm to 0.1 mm above the opposite ends of the return passage.

10. The linear motion guide unit constructed as defined in claim 1 wherein the raised land on the flexible column of the sleeve has a leading profile or slope and a trailing profile or slope tilt towards each other in the lengthwise direction of the sleeve so as to make an angle of substantially 30°.

\* \* \* \* \*